US010807806B1

(12) United States Patent
Womack et al.

(10) Patent No.: US 10,807,806 B1
(45) Date of Patent: Oct. 20, 2020

(54) LINEAR SHUTTLE FOR CONTAINER INVERTORS IN A CONVEYOR SYSTEM

(71) Applicant: Sentry Equipment Erectors, Inc., Forest, VA (US)

(72) Inventors: Leslie Womack, Forest, VA (US); Michael Wilson, Goode, VA (US); Thomas Sisson, Jr., Forest, VA (US)

(73) Assignee: SENTRY EQUIPMENT ERECTORS, INC., Forest, VA (US)

( * ) Notice: Subject to any disclaimer, the term of this patent is extended or adjusted under 35 U.S.C. 154(b) by 0 days.

(21) Appl. No.: 16/816,967

(22) Filed: Mar. 12, 2020

(51) Int. Cl.
| B65G 47/248 | (2006.01) |
| B65G 11/20 | (2006.01) |
| B65G 11/18 | (2006.01) |
| B65G 11/02 | (2006.01) |
| B65G 11/06 | (2006.01) |

(52) U.S. Cl.
CPC .......... *B65G 47/248* (2013.01); *B65G 11/023* (2013.01); *B65G 11/063* (2013.01); *B65G 11/183* (2013.01); *B65G 11/203* (2013.01); *B65G 2201/0252* (2013.01); *B65G 2812/085* (2013.01)

(58) Field of Classification Search
CPC .. B65G 47/248; B65G 11/023; B65G 11/183; B65G 11/203; B65G 2201/0252; B65G 2812/085; B65G 11/063
USPC .......................... 198/389–390; 193/12–13, 46
See application file for complete search history.

(56) References Cited

U.S. PATENT DOCUMENTS

| 1,193,624 | A | | 8/1916 | Small | |
| 2,097,368 | A | | 10/1937 | Frank | |
| 2,529,603 | A | | 11/1950 | Galt | |
| 2,800,211 | A | | 7/1957 | Madden | |
| 3,314,522 | A | * | 4/1967 | Croall | B65G 47/248 198/417 |
| 3,331,486 | A | | 7/1967 | Towry | |
| 3,494,867 | A | * | 2/1970 | Hotten | C10M 105/54 252/75 |
| 3,785,473 | A | * | 1/1974 | Cook | B65G 47/248 198/402 |
| 3,797,624 | A | | 3/1974 | Powell et al. | |
| 3,902,682 | A | | 9/1975 | Woll | |

(Continued)

FOREIGN PATENT DOCUMENTS

| DE | 10 2015 100 422 | 7/2016 |
| EP | 2 192 057 | 6/2010 |

(Continued)

*Primary Examiner* — Mark A Deuble
(74) *Attorney, Agent, or Firm* — Nixon & Vanderhye P.C.

(57) ABSTRACT

A gravity conveyor guide including: a frame; a conveyor track attached to the frame at a downwardly angle for guiding a plurality of moving containers down the conveyor track along a travel path; a pair of opposing struts attached on either side of the conveyor track; a rail assembly attached to the pair of opposing struts above the conveyor track; a linear shuttle carriage slidingly attached to the rail assembly, the linear shuttle carriage having a bank of at least two container rotating devices disposed; wherein the linear shuttle carriage slides on the rail assembly to move from a first position in which one of the at least two container rotating devices is aligned with the travel path to a second position in which a second one of the at least two container rotating devices is aligned with the travel path.

15 Claims, 6 Drawing Sheets

(56) References Cited

U.S. PATENT DOCUMENTS

| | | | |
|---|---|---|---|
| 3,961,705 A * | 6/1976 | Suciu | B08B 9/205 |
| | | | 198/402 |
| 4,364,463 A * | 12/1982 | Faltus | B65G 15/14 |
| | | | 198/402 |
| 4,458,801 A | 7/1984 | Nichols | |
| 4,479,574 A * | 10/1984 | Julius | B65G 15/50 |
| | | | 134/125 |
| 4,492,299 A * | 1/1985 | McLeod | B65G 47/248 |
| | | | 198/417 |
| 4,641,672 A * | 2/1987 | Lewbart | A47L 15/245 |
| | | | 134/127 |
| 4,991,705 A | 2/1991 | Francioni | |
| 5,609,237 A * | 3/1997 | Lenhart | B65G 47/248 |
| | | | 198/406 |
| 6,499,582 B1 | 12/2002 | Gillott | |
| 6,944,944 B1 | 9/2005 | Craythorn et al. | |
| 7,617,921 B2 | 11/2009 | Workman et al. | |
| 8,474,597 B2 * | 7/2013 | Pier | B65G 47/1407 |
| | | | 198/396 |
| 10,703,523 B2 * | 7/2020 | Thomas | B65G 47/248 |
| 2002/0157729 A1 | 10/2002 | Baker | |
| 2008/0203109 A1 | 8/2008 | Workman et al. | |

FOREIGN PATENT DOCUMENTS

| | | |
|---|---|---|
| EP | 3 045 409 | 7/2016 |
| EP | 3 045 410 | 7/2016 |
| IT | 20110026 | 8/2012 |
| IT | 201600072697 | 1/2018 |
| WO | 2018/011678 | 1/2018 |

\* cited by examiner

LINEAR SHUTTLE FOR CONTAINER INVERTORS IN A CONVEYOR SYSTEM

TECHNICAL FIELD

The disclosure is generally related to conveyors for containers to be filled and, more specifically, to gravity conveyors for fluid or aggregate containers which include a rinser.

BACKGROUND

A gravity container conveyor in the beverage industry uses gravity to transport containers along a downward travel path guided by a moving conveyor mechanism or static track. As the containers travel the path and before being filled, the containers are flushed out by a rinser. The rinser typically injects pressurized air or water into the container to dislodge any debris from the interior surfaces of the container and allow the debris to flow out of the container.

The rinser requires the container to be inverted. The containers typically travel in an upright position along the travel path. Before the containers enter the rinser and go through the rinse process, the containers need to be inverted from a right side up position to an upside down position for them be able to be sprayed with air or water into the inside of them, and inverted back to a right side up position as they are discharged from the rinse before continuing on to be filled.

Invertors and revertors are devices for inverting and reverting containers moving along a travel path in a conveyor. Invertors and revertors are generally specific to one container size. The invertors and revertors must be replaced to configure the travel path for a different container size.

In the beverage industry, there are a multitude of container sizes varying, for example, between 7 fl. oz. to 20 fl. oz. To accommodate the varying sizes of the containers, a laborious process of changing the equipment that rotates the containers is required. That is, for example, removing a 7 fl. oz. component and replacing it with a 20 fl. oz. component requires special tools and a skilled technician to be able to change the parts.

Some known devices, such as shown in U.S. Pat. No. 7,617,921, use a complex rotary device to accommodate the rotation of various container sizes as they enter and discharge the rinser, however, this type of device requires skilled technicians to complete the interface with the up and down stream equipment.

Therefore, there is a need for an apparatus to be able to adjust the container twisting device along a container conveyor assembly to accommodate varying container sizes without requiring complex tools and skilled workforce, and without extended delays in shutting down the assembly.

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

SUMMARY

The disclosure is embodied as a linear shuttle carriage for housing a bank of multiple container rotating devices, wherein the linear shuttle carriage slides along a rail apparatus attached to a conveyor guide and supporting the linear shuttle carriage above the conveyor guide in which the container rotating devices can be positioned on the path of a series of sliding containers by sliding the carriage from one position to a series of other positions.

The invention may be embodied as a gravity conveyor guide comprising: a frame; a conveyor track attached to the frame at a downwardly angle for guiding a plurality of moving containers down the conveyor track along a travel path; a pair of opposing struts attached on either side of the conveyor track; a rail assembly attached to the pair of opposing struts above the conveyor track; a linear shuttle carriage slidingly attached to the rail assembly, the linear shuttle carriage having a housing and at least two container rotating devices disposed within the housing; wherein the linear shuttle carriage slides on the rail assembly to move from a first position in which one of the at least two container rotating devices is aligned with the travel path to a second position in which a second one of the at least two container rotating devices is aligned with the travel path.

The invention may also be embodied as a container adjusting apparatus comprising a linear sliding carriage having a housing; at least two container rotating devices disposed within the housing; a support rail; and wherein the linear sliding carriage is supported on the support rail.

BRIEF DESCRIPTION OF THE DRAWINGS

For an understanding of embodiments of the disclosure, reference is now made to the following description taken in conjunction with the accompanying drawings, in which.

DETAIL DESCRIPTION OF SOME EMBODIMENTS

Some embodiments will now be described with reference to the Figures, like numerals being used to refer to like and corresponding parts of the various drawings.

Figure 1:
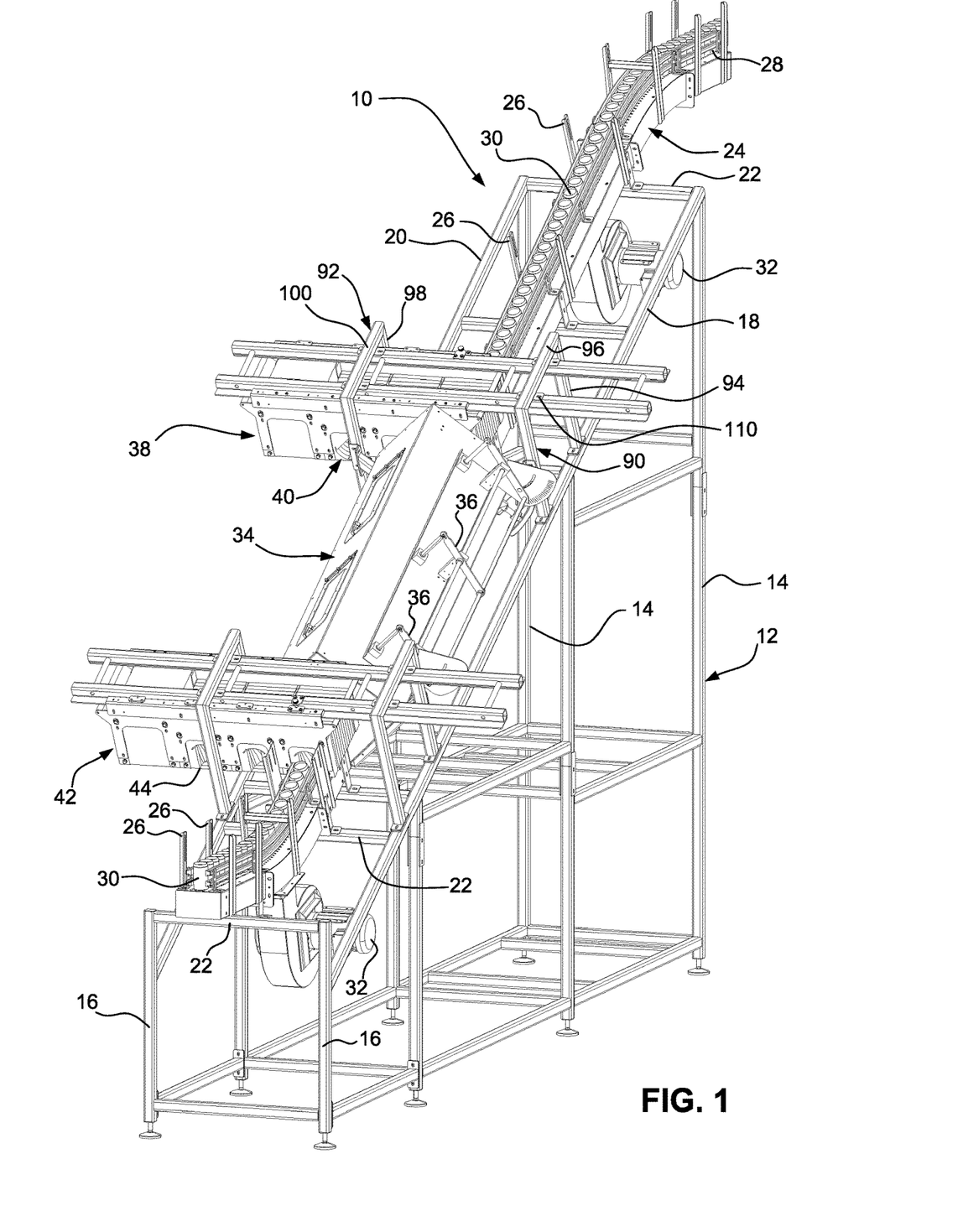
FIG. 1 is a perspective view of a portion of a beverage can filling assembly illustrating a portion of a conveyor guide with a gravity rinser and two linear shuttle carriages in accordance with an exemplary embodiment.
Figure 2:
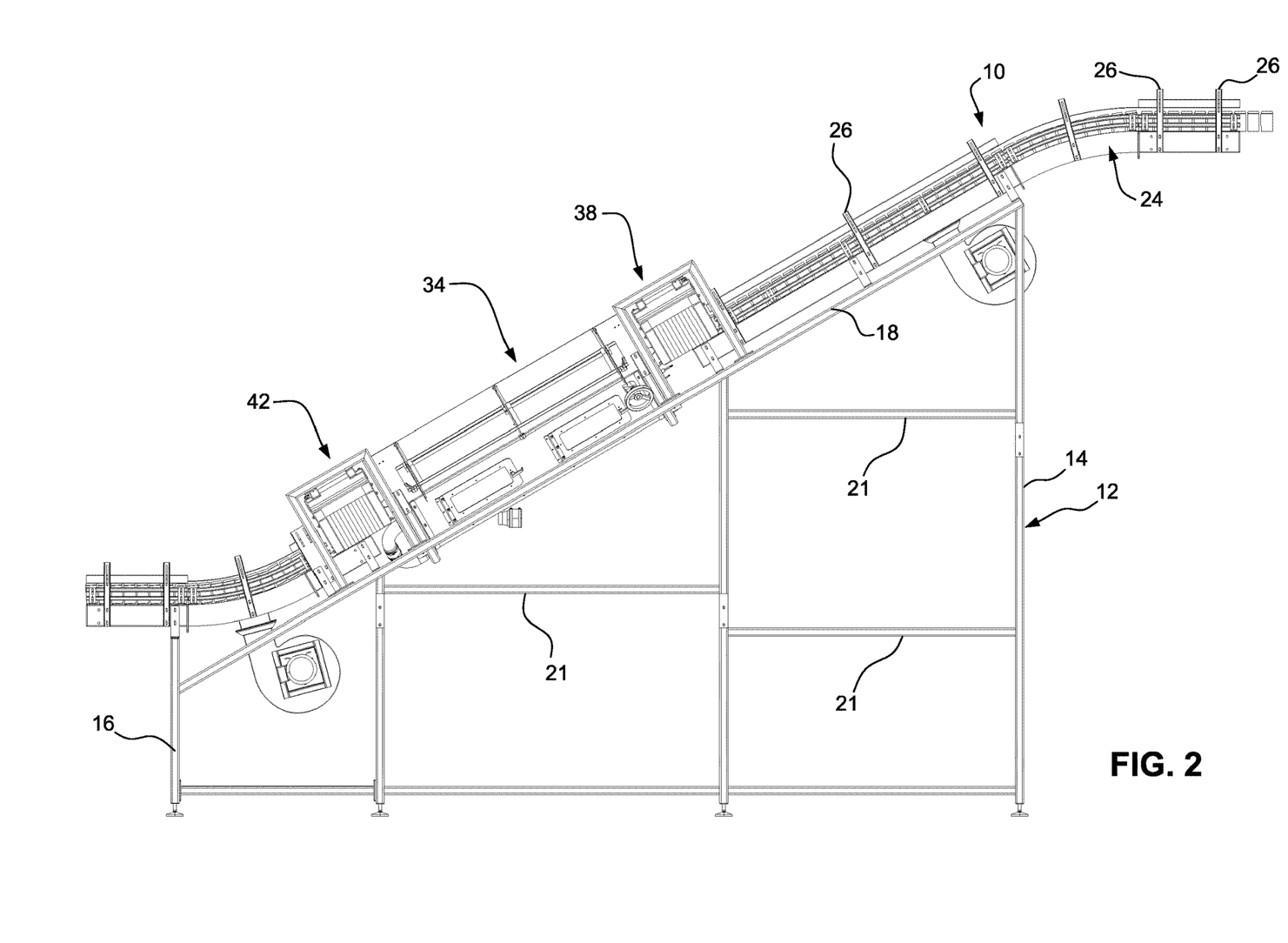
FIG. 2 is a side view of the portion of the conveyor track shown in FIG. 1.

Referring now to FIGS. 1 and 2, a gravity conveyor guide 10 illustrating a portion of an assembly of can filling or cannery for aluminum cans is illustrated. As will be explained in greater detail, a line of cans slide down a track by the force of gravity at very high speed, go through an invertor which flips, twists, or rotates each can for example, 135 degrees, as they enter a rinse box to be rinsed and cleared of any debris in the rinser box. As each can comes out of the rinse box, it enters a revertor which flips, twists, or rotates each can to an upright position as each can comes through to be discharged onto a conveyor to continue on to a filling station on the assembly.

The gravity conveyor guide 10 may include a support frame 12 having a first pair of vertical bars 14 and a second pair of vertical bars 16. One end of the first and second pairs of vertical bars 14 is secured to the ground, and the opposing end is connected to a first angled bar 18 and a second angled bar 20 there-between. The support frame 20 includes a number of cross bars 21 connected to one another by, for example, but not limited to, bolts or welding, and connected to the first part of vertical bars 14, second pair of vertical bars, and the first and second angled bars 18, 20, forming the support frame for the conveyor guide. The height of the first pair of vertical bars 14 is greater than the height of the second pair of vertical bars 16. This will result in the first and second angled bars, 18, 20 be positioned at an angle relative to the horizontal plane of the support frame 20.

A conveyor track 24 is supported and attached on top of the plurality of cross bars 22 at a downwardly angle, and confined laterally within a position with a plurality of vertical beams 26. Extending along the length of the conveyor track 24 is a pair of guardrails 28 spaced apart to support a plurality of containers 30 sliding on the conveyor track 24. This configuration will result in the plurality of the containers 30 to slide down the conveyor track 24 by force of gravity at high speeds.

The conveyor track 24 may also include a number of air blowers 32 operably attached to a lower part of the conveyor track 24 for blowing air along the track to provide an air cushion allowing a slight lift of the containers and alleviating friction between the bottom of the containers 30 and the surface of the conveyor track 24 as they slide down the track.

As will be explained in a greater detail herein, as the series of juxtaposed containers 30 travel down the conveyor track 24, they will go through a twist or turn fitting device positioned on an infeed linear shuttle carriage for turning each container upside down, then through a rinse box 34 supported and attached to the support frame 12 by adjustable arms 36. The rinse box 34 operates to spray air into each rotated container resulting in particulates to dislodge into the collection chamber. The rinse box operated to deionize the containers and removing the debris inside them, and the cams remained in an upside down configuration as they travel through the rinse box 34.

Figure 4:
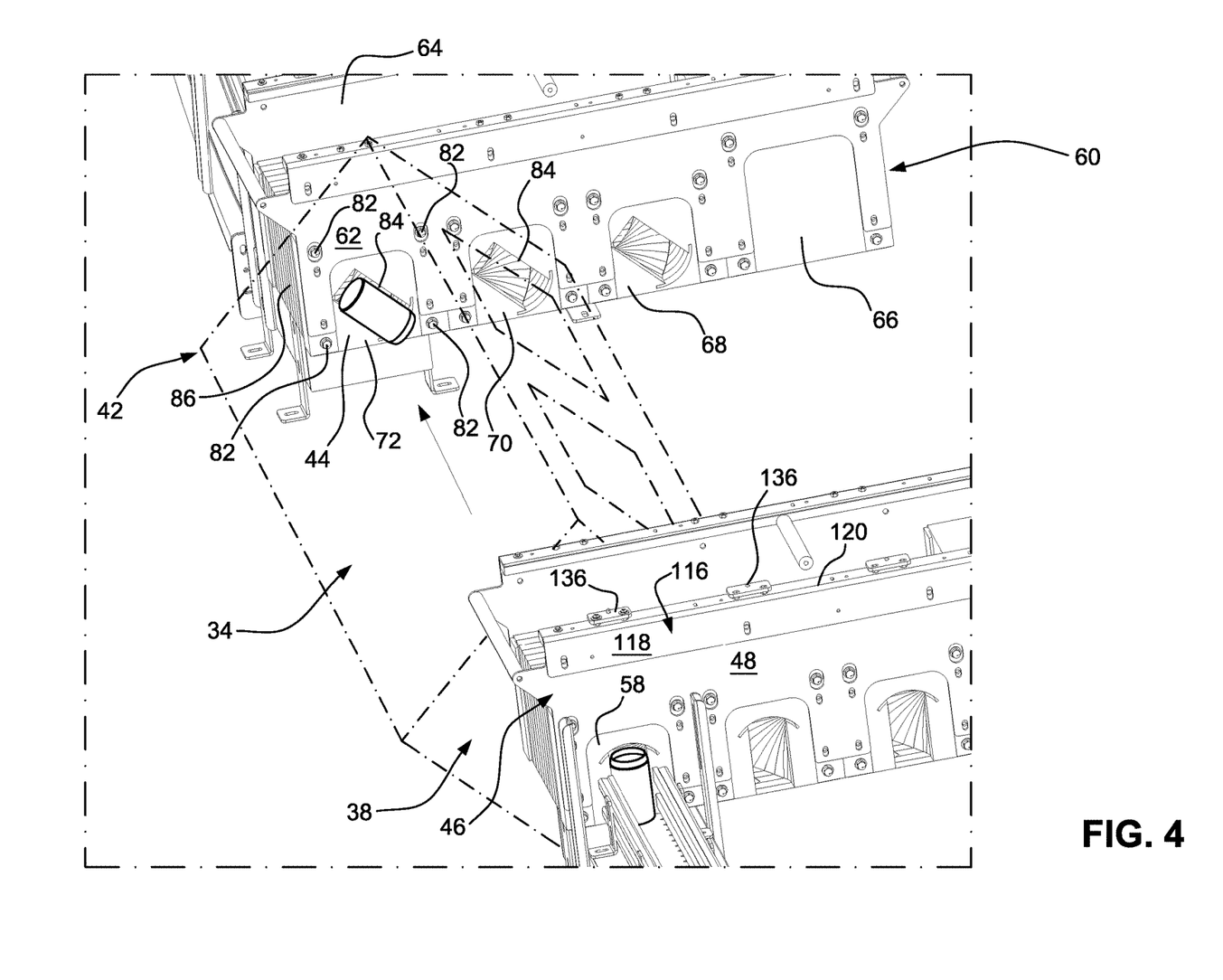
FIG. 4 is a detailed view of the infeed and discharge linear shuttle carriages illustrating the rotation of cans through the change parts.
Figures 5A, 5B:
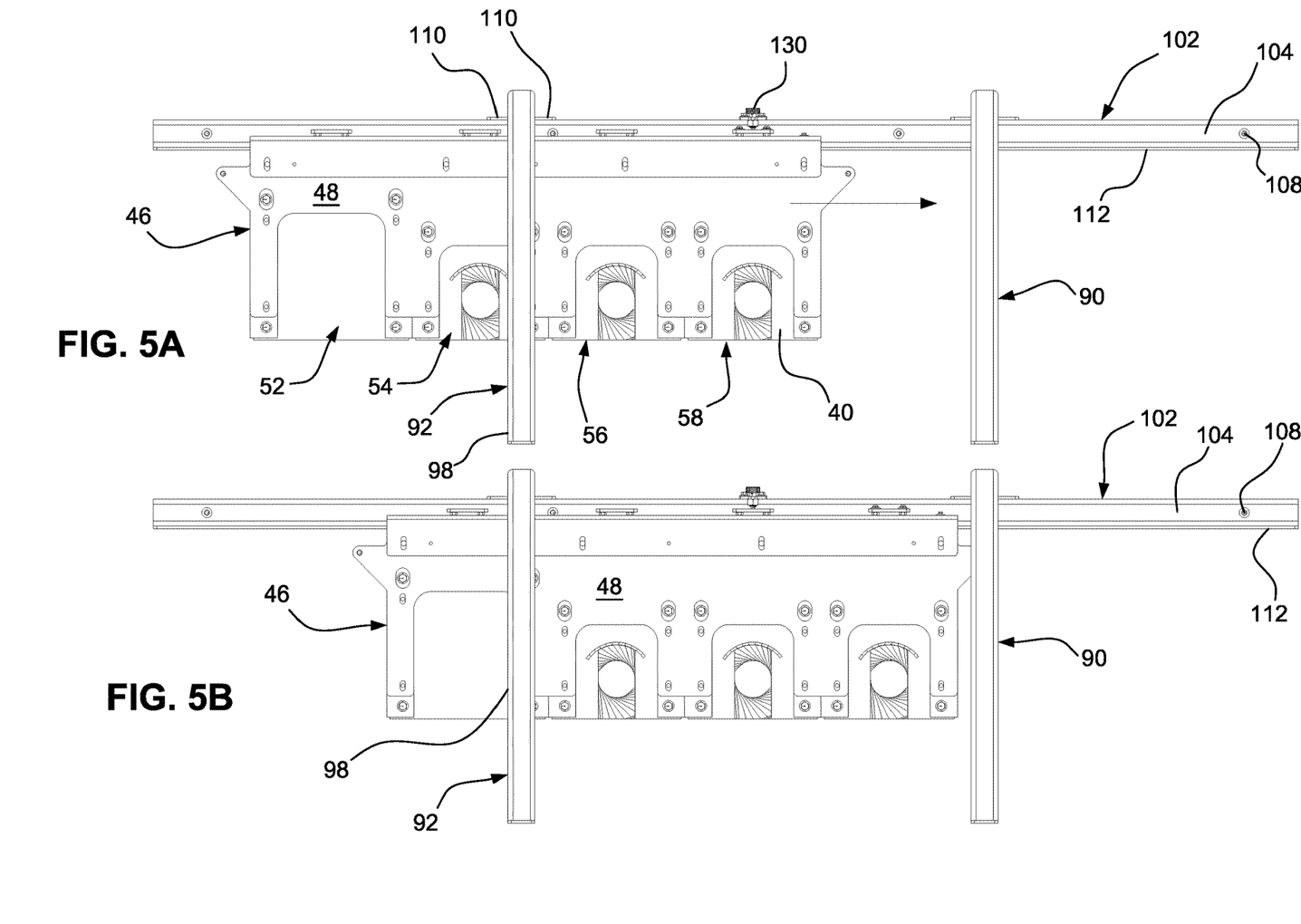
FIG. 5A is a side perspective view of the infeed linear shuttle carriage in a first position in which the change part is accommodating a first can size.
FIG. 5B is a side perspective view of the infeed linear shuttle carriage of FIG. 5A in which the infeed linear shuttle carriage is shifted to the right in which a second change part is in position to accommodate a second can size; and, FIG. 6 is a detailed perspective view of the infeed linear shuttle carriage supported on a frame.

Referring to FIGS. 4 and 5A, an infeed linear shuttle carriage 38 including a plurality of different change parts forming an invertor are positioned an entry of the rinse box 34. A discharge linear shuttle carriage 42 including a plurality of different sized change parts forming a revertor are at the discharge location of the rinse box 34. The structural details of the change parts will be explained in greater detail herein.

The infeed linear shuttle carriage 38 may include housing 46 having a first side plate 48 and a second side plate 50 spaced apart forming a substantially rectangular shape and configuration. Each of the first and second side plates 48, 50, may include a first cut-out portion 52, a second cut-out portion 54, a third cut-out portion 56, and a fourth cut-out portion 58, in which the each of the first, second, third, and fourth cut-out portions in the first side plate 50 are symmetrically aligned with the first, second third, and fourth cut-out portions of the second side plate 50. It is noted that the number of cut-out portions may increase or decrease in various embodiments, as will be explained herein, to accommodate change parts for various container sizes.

Similarly, the discharge linear shuttle carriage 42 may include housing 60 having a first side plate 62 and a second side plate 64 spaced apart forming a substantially rectangular shape and configuration. Each of the first and second side plates 62, 64, may include a first cut-out portion 66, a second cut-out portion 68, a third cut-out portion 70, and a fourth cut-out portion 72, in which the each of the first, second, third, and fourth cut-out portions in the first side plate 62 symmetrically align with the first, second third, and fourth cut-out portions of the second side plate 64. Cut-out portions on the first and second side plates, along with fasteners withing the housing, may form a bay to receive an invertor 40 or revertor 44. It is further noted that the number of cut-out portions may increase or decrease in a various embodiments, as will be explained herein, to accommodate change parts for various container sizes.

Figure 6:
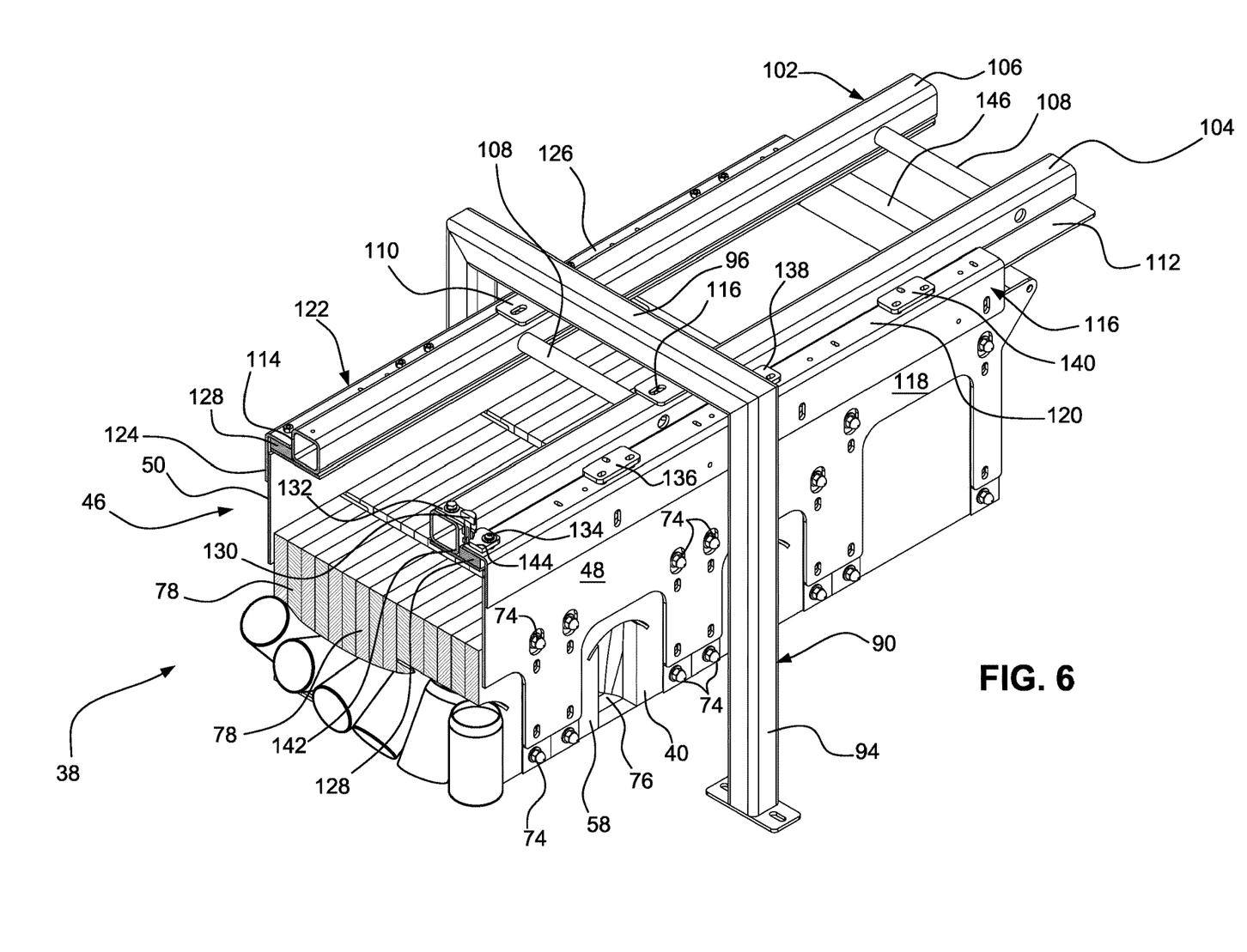

Referring to FIG. 6, the infeed linear shuttle carriage 38 is illustrated having a change part or invertor 40 secured between the first and second side plates, 48, 50, with a plurality of bolts 74. It is noted that the structural components of the infeed linear shuttle carriage 38 may be identical to the structural components of the discharge linear shuttle carriage 42. The invertor 40 is dimensioned and configured for a specific container size (for example, can, bottle, or jar for beverages or other foods), and includes an inlet 76 for entry of a container in an upright position as it slides down the conveyor track. The invertor 40 may include a multiple plastic or metal 78 change parts in an angled spiral form to create a twisted track for the container to be rotated as it goes through the invertor at high speeds, and be discharge at an outlet 80 in which the container is rotated at an angle as it continues on the conveyor track through the rinse box 34. For illustration purposes, the infeed linear shuttle carriage 38 is positioned to have the invertor 40 with the specification container size configuration aligned with the conveyor track.

Referring to FIG. 4, the discharge linear shuttle carriage 42 is illustrated having a change part or revertor 44 secured between the first and second side plates, 62, 64, with a plurality of bolts 82. The revertor 44 includes an inlet 84 oriented and configured identical to the orientation and configuration of the outlet 80 of the invertor 40. As the rinsed container exists the rinse box 34, they will enter the revertor 44 through the inlet 84 at an angle, and similarly travel through a multiple plastic or metal 86 change parts in an angled spiral form to create a twisted track for the container to be rotated as it goes through the revertor at high speeds, and be discharge at an outlet 88 in which the container is rotated and reverted back to an upright position and configuration to be discharged in an upright position to continue on to the filling station.

Figure 3:
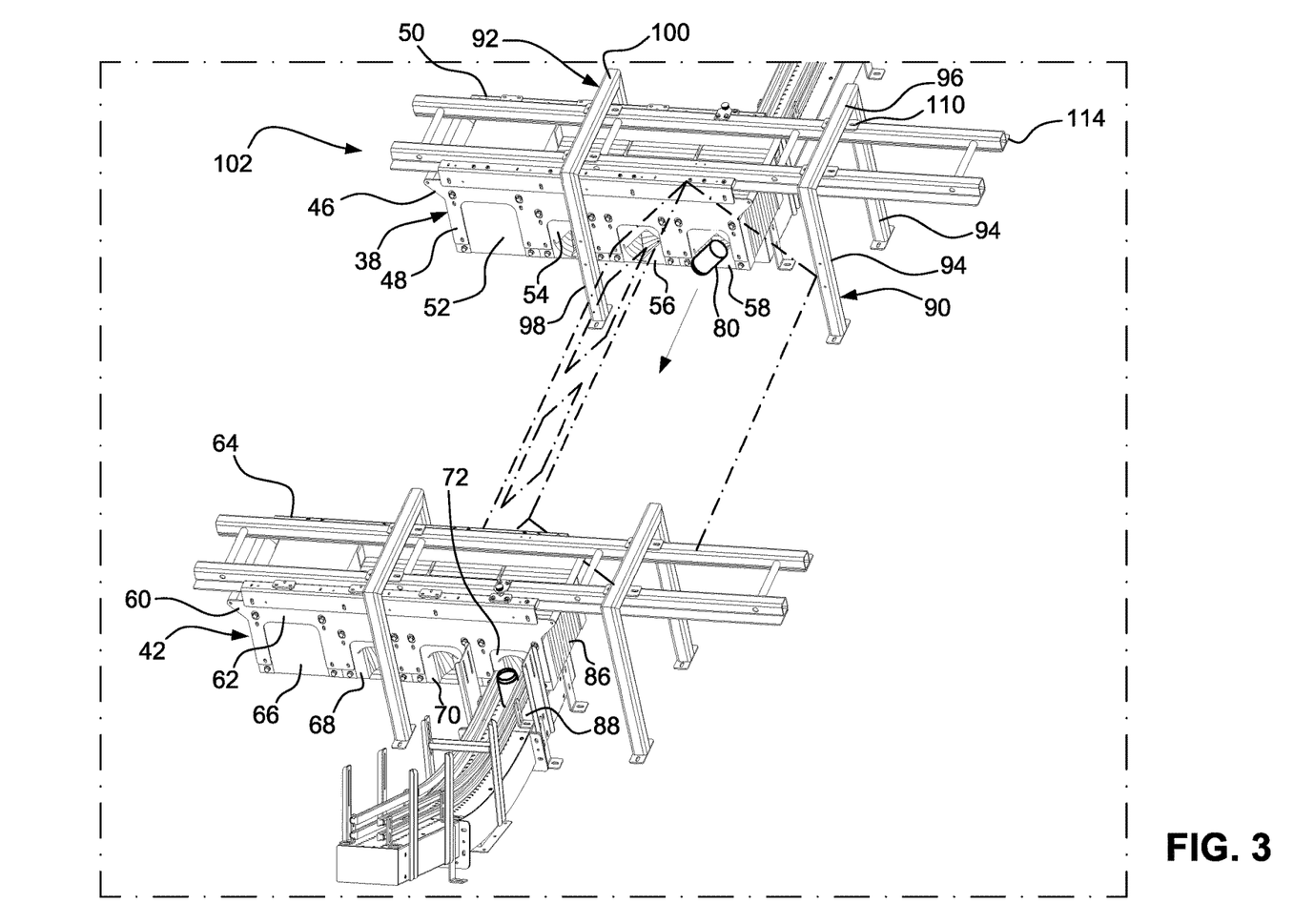
FIG. 3 is a detailed perspective view of the infeed linear shuttle carriage and the discharge linear shuttle carriage.

Referring to FIGS. 3 and 6, the supporting of the infeed linear shuttle carriage 38 onto the support frame 12 of gravity conveyor guide is explained in greater detail. A first strut 90 and a second strut 92 spaced apart bound the conveyor track 24 in between. The first strut 90 includes a pair of upright legs 94 attached to by, for example, bolts to the first angled bar 18 at one end, and includes a cross-beam 96 attached to or integrally formed at the opposing ends and connecting the pair of upright legs 94.

The second strut 92 includes a pair of upright legs 98 attached to by, for example, bolts to the second angled bar 20 at one end, and includes a cross-beam 100 attached to or integrally formed at the opposing ends of and connecting the pair of upright legs 98.

A ladder-shaped support structure 102 including a first elongated bar 104 and a second elongated bar 106 spaced apart and transversely connected to one another by a plurality of tubular members 108.

Each of the first and second elongated bars 104, 106, may include a hollow square cross-sectional shape and configuration. The ladder-shaped support structure 102 extends beyond the first and second struts, 90, 92, and the width of the support frame 12.

The first and second cross beams 96, 100 include opposing flanges 110 on a lower surface thereof for attaching to the first and second elongates bars 102, 104 by, for example, but not limited to, bolts or welding. Therefore, the ladder-shaped structure 102 is supported over the conveyor track, and as will be explained in greater detail, will support the infeed linear shuttle carriage 38 or discharge linear shuttle carriage 42 in a sliding manner.

A first elongated outwardly extending flange 112 is attached to or integrally formed with a lower surface of the first elongated bar 104. A second elongated outwardly extending flange 114 is attached to or integrally formed with a lower surface of the second elongated bar 106.

The housing 46 for the infeed linear shuttle carriage 38 includes a first L-shaped bracket 116 formed of sheet metal having a first plate portion 118 and a second plate portion 120 perpendicular to the first plate portion 118. The first plate portion 118 is attached at an inner surface thereof to the outer surface of the first side plate 48.

The housing 46 further includes a second L-shaped bracket 122 formed of sheet metal having a first plate portion 124 and a second plate portion 126 perpendicular to the first plate portion 124. The first plate portion 124 is attached at an inner surface thereof to the outer surface of the second side plate 50.

The infeed linear shuttle carriage 38 is supported and container slide along the ladder-shaped structure 102 before being secured thereto at a desired location on each side by the second plate portion 120 being in facing relation to first elongated outwardly extending flange 112, and the second plate portion 126 for the second L-shaped bracket 122 being on top of and in facing relation with second elongated outwardly extending flange 114. On each side, an adjustable guide bar 128 sandwiched between second plate portion 120 and the first elongated outwardly extending flange 112 on one side, and the second plate portion 126 for the second L-shaped bracket 122 and second elongated outwardly extending flange 114 on the other side. The adjustable guide bars 128 can adjust the height of infeed linear shuttle carriage in a vertical direction relative to the conveyor track 24.

Referring to FIG. 5A, the infeed linear shuttle carriage 38 is positioned so that the invertor 40 positioned within the fourth cut-out portion 58 is aligned with the conveyor track 24 for receiving the sliding containers 30. As the arrow pointing to the right in FIG. 5A indicates, the infeed linear shuttle carriage 38 may be unlocked and may slide to the right so that another invertor 40 for a different size container 30 may be aligned in the path of the sliding containers on the conveyor track 24. That is, without requiring a mechanical replacement of an invertor or a revertor, and without removing the change part with tools and calibrating them to be replaced with another change part to accommodate a different size container or bottle, the infeed linear shuttle carriage 38 can simply slide to the right or left to align the appropriately sized invertor or revertor with the conveyor track.

In order to laterally align the infeed linear shuttle carriage 38 so that the appropriately sized invertor or change part is aligned with the conveyor track 24, for example, in the embodiment shown in FIG. 6 having four different change parts, the alignment is achieved by the position of a first twist fitting 134, a second twist fitting 136, a third twist fitting 138, and a fourth twist fitting 140 attached at appropriate positions on the second plate portion 120 corresponding to one of the four change parts.

A slip-on flange 132 is attached to or bolted at one end to the first elongate bar 104, and includes a spring biased locking knob 130 operably secured at a second opposing end. The spring biased locking knob 130 includes a pin 142 which is inserted into an aperture 144 of the first twist fitting 134, and can be lifted out of the aperture 144 and twisted to remain in a raised configuration to unlock the infeed linear shuttle carriage 38 from a position as shown in FIG. 6. Once in an unlocked position and configuration, a handle bar 146 on the infeed linear shuttle carriage 38 can be used to push or pull the infeed linear shuttle carriage 38 to the left or right until the desired change part is aligned along the conveyor belt track. The pin 142 for the spring biased locking knob 130 can be reinserted in one of the other twist fittings to lock the infeed linear shuttle carriage 38 in that position. If another linear shuttle carriage requiring additional change parts is desired, in the same manner of unlocking the linear shuttle carriage, it can be slid off and removed from the ladder-shaped structure 102 and replaced with another linear shuttle carriage.

Moreover, the a bank of change parts mounted to the infeed linear shuttle carriage 38 or discharge linear shuttle carriage 42 may be replaced in their entirety with another bank of change parts on the infeed linear shuttle carriage or discharge linear shuttle carriage which include additional varying sized invertors and revertors. The bank of change parts can be replaced with another bank of change parts having a plurality of different sized change parts. The bank of change parts not only can move and slide to the left or right on the linear shuttle to align a change part for a different size container, but also can be slid off the rails, removed, and replaced with another bank of change parts having a different set of change parts. The infeed linear shuttle carriage and change part bank shown in FIG. 5A may be identical the discharge linear shuttle carriage and change part bank.

The linear shuttle carriages of this invention have the ability to effect adjustment to different sized containers, both in height and diameter, without requiring special separate tools because all the adjustments are made by sliding the linear shuttle carriages on a track to align the desired change part for a specific container size with the path of gravity conveyor track guiding the containers.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means "and/or" (either or both). Furthermore, characteristics or steps which have been described may also be used in combination with other characteristics or steps and in any order unless the disclosure or context suggests otherwise.

The invention is:
1. A gravity conveyor guide comprising:
a frame;
a conveyor track attached to the frame at a downwardly angle for guiding a plurality of moving containers down the conveyor track along a travel path;

a pair of opposing struts attached on either side of the conveyor track;

a rail assembly attached to the pair of opposing struts above the conveyor track;

a linear shuttle carriage slidingly attached to the rail assembly, the linear shuttle carriage having a bank of at least two container rotating devices disposed within the bank;

wherein the linear shuttle carriage slides on the rail assembly to move from a first position in which one of the at least two container rotating devices is aligned with the travel path to a second position in which a second one of the at least two container rotating devices is aligned with the travel path.

2. The gravity conveyor guide of claim 1, wherein the rail assembly includes support rails over the conveyor track and fixed to the opposing struts, wherein the support rails support the linear shuttle carriage and the linear shuttle carriage is configured to slide along the support rails.

3. The gravity conveyor guide of claim 2, wherein the support rail includes a pair of opposing elongated outwardly extending flanges.

4. The gravity conveyor guide of claim 3, wherein the bank includes a housing including two or more bays each configured to receive one of the at least two container rotating devices.

5. The gravity conveyor guide of claim 4, wherein the housing includes a pair of L-shaped brackets each having a first plate portion and a second plate portion perpendicular to the first plate portion, wherein the first and second plate portions slidingly rest on the respective opposing elongated outwardly extending flanges.

6. The gravity conveyor guide of claim 5, further comprising a plurality of twist fittings attached to and along the second plate portion, each twist fitting being positioned above a corresponding container rotating device, each twist fitting having an aperture extending therethrough, and wherein a spring biased locking knob includes a pin portion dimensioned and configured to be receiving the aperture of the twist fitting.

7. The gravity conveyor guide of claim 1, further comprising a rinse box attached to the frame, aligned with the conveyor track and forming a portion of the travel path, wherein an upstream end of the rinse box is aligned with a selected container rotating device of the linear shuttle carriage, and a downstream end of the rinse box is aligned with a second selected container rotating device of a second linear shuttle carriage.

8. The gravity conveyor guide of claim 1, wherein the at least two container rotating devices are each removably secured to a respect cut-out portion of the housing, and wherein each of the at least two container rotating devices includes an inlet for receiving a container and an outlet for discharging the container.

9. A container adjusting apparatus, comprising:

a linear sliding carriage;

at least two container rotating devices supported by linear sliding carriage and arranged along a length of the linear sliding carriage;

a support rail; and wherein the linear sliding carriage is supported on the support rail.

10. The container adjusting apparatus of claim 9, wherein the support rail is transversely secured across from a gravity conveyor guide for receiving a series of containers traveling through one of the at least two container rotating devices.

11. The container adjusting apparatus of claim 9, wherein the linear sliding carriage includes a housing, at least two container rotating devices are removably secured within a cut-out portion of the housing, and each of the at least two container rotating devices includes an inlet for receiving the container, and an outlet for discharging the container.

12. The container adjusting apparatus of claim 11, further comprising a pair of struts secured to the conveyor track for transversely supporting the rail above the conveyor track.

13. The container adjusting apparatus of claim 12, wherein the support rail includes a pair of opposing elongated outwardly extending flanges.

14. The container adjusting apparatus of claim 13, wherein the linear sliding carriage includes a pair of L-shaped brackets having a first plate portion and a second plate portion perpendicular to the first plate portion, wherein the first and second plate portions slidingly rest on the respective opposing elongated outwardly extending flanges.

15. The container adjusting apparatus of claim 14, further comprising a plurality of twist fittings attached to and along the second plate portion, each twist fitting being positioned above a corresponding container rotating device, each twist fitting having an aperture extending therethrough, and wherein a spring biased locking knob includes a pin portion dimensioned and configured to be receiving the aperture of the twist fitting.

* * * * *